(12) United States Patent
Nakamura

(10) Patent No.: US 7,856,313 B2
(45) Date of Patent: Dec. 21, 2010

(54) ELECTRONIC DEVICE, DISPLAY PROCESSING METHOD AND PROGRAM

(75) Inventor: Yutaka Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 887 days.

(21) Appl. No.: 11/526,513

(22) Filed: Sep. 25, 2006

(65) Prior Publication Data

US 2007/0073474 A1 Mar. 29, 2007

(30) Foreign Application Priority Data

Sep. 27, 2005 (JP) .............................. 2005-279109

(51) Int. Cl.
*G08G 1/137* (2006.01)
(52) U.S. Cl. .................. 701/208; 340/995.27
(58) Field of Classification Search ......... 701/200–226; 340/995.1–995.28
See application file for complete search history.

(56) References Cited

U.S. PATENT DOCUMENTS

| | | | | |
|---|---|---|---|---|
| 5,121,326 | A | * | 6/1992 | Moroto et al. ............... 701/212 |
| 6,285,317 | B1 | * | 9/2001 | Ong ....................... 342/357.13 |
| 2004/0049341 | A1 | * | 3/2004 | Fujiwara ..................... 701/210 |
| 2007/0233380 | A1 | * | 10/2007 | Tanaka ....................... 701/211 |

FOREIGN PATENT DOCUMENTS

| | | |
|---|---|---|
| JP | 59-208699 | 11/1984 |
| JP | 10-197260 | 7/1998 |
| JP | 2002-297647 | 10/2002 |
| JP | 2004-132737 | 4/2004 |

OTHER PUBLICATIONS

Minimap—WoWWiki. Multiple Authors. http://www.wowwiki.com/Minimap. Downloaded Aug. 2, 2010.*

* cited by examiner

*Primary Examiner*—Mark Hellner
*Assistant Examiner*—Ari M Diacou
(74) *Attorney, Agent, or Firm*—Robert J. Depke; Rockey, Depke & Lyons, LLC

(57) ABSTRACT

An electronic device, a display processing method and a program for displaying a direction and distance of a moving body outside of a displayed range of a map, seen from a certain position on the map and a moving direction of the moving body at a time, are provided. A calculation portion calculates a distance from a current position of a portable device 3 to the destination based on the current position information and position information of the destination included in map data; a moving direction specifying portion specifies a current moving direction of the portable device; a display processing portion determines a position, size and direction of an arrow on the map based on the current position information of the portable device, position information of the destination, a distance between the destination and the current position, and the moving direction and generates a map image to be displayed.

9 Claims, 6 Drawing Sheets

ELECTRONIC DEVICE, DISPLAY PROCESSING METHOD AND PROGRAM

CROSS REFERENCES TO RELATED APPLICATIONS

The present invention contains subject matter related to Japanese Patent Application JP2005-279109 filed in the Japanese Patent Office on Sep. 27, 2005, the entire contents of which being incorporated herein by reference.

BACKGROUND OF THE INVENTION

1. Field of the Invention

The present invention relates to an electronic device, a display processing method and a program for displaying a direction and distance of a moving object and a moving direction of the moving object out of a display range of a map seen from a certain position in the map at a time.

2. Description of the Related Art

In display techniques of a map image for navigation, a position of a user is displayed on a map when the user is within the map range.

For example, when displaying a user's position by an arrow, the user's position is expressed by a position of the arrow, a moving direction of the user is expressed by a direction of the arrow, and a distance to a destination is expressed by a distance on the screen.

SUMMARY OF THE INVENTION

However, when the user is out of the displayed map range, there has not been a method of displaying information of the three points at a time and they have been displayed separately.

For example, the Japanese Unexamined Patent Publication No. 2002-297647 discloses a technique of displaying an icon of a user and an arrow indicating a direction alternately or by superimposing the two at a crossing point of a line from the user's position to a center of the map and a boundary of the map when the user is out of the displayed map.

Also, the Japanese Unexamined Patent Publication No. 59-208699 discloses a technique for displaying a position (direction) of a vehicle at an edge of the map when the vehicle is outside of the displayed map.

The Japanese Unexamined Patent Publication No. 10-197260 discloses a technique for a device for displaying traffic information by displaying a position and direction of a traffic congestion (jam) by adding a mark at a crossing point of a road having the traffic congestion and an edge of the displayed map when a starting point of the congestion is out of the displayed map range.

The Japanese Unexamined Patent Publication No. 2004-132737 discloses a technique for a device for displaying information on a traffic congestion by separately displaying a distance to a point of traffic congestion and the direction.

The above techniques disclosed in the patent publications, however, suffer from a disadvantage that a map image becomes complicated when displaying contents separately and it becomes hard to perceive information on the three points explained above.

Also, a method for displaying one information by shifting a time suffer from a disadvantage that the three information cannot be obtained at a time.

It is desired to provide an electronic device, a display processing method and a program for simultaneously displaying a direction and distance of a moving object and a moving direction of the moving object outside of a display range of a map seen from a certain position in the map.

An electronic device of an embodiment of the present invention, includes: a memory for storing map data including a position information of a certain position and expressing a map of a predetermined range including the certain position; a current position information obtaining means for obtaining a current position information of a moving body being outside of the map of a predetermined range; a distance calculation means for calculating a current distance between the certain position and a position of the moving body based on the position information of the certain position included in the map stored in the memory and the current position information of the moving body obtained by the current position information obtaining means; a moving direction specifying means for specifying a current moving direction of the moving body; a display image generation means for generating a map image of the map by adding a mark expressing a plurality of information on a straight line connecting the certain position on the map and the current position of the moving body; and a display apparatus for displaying the map image; wherein the plurality of information expressed by the mark includes a current moving direction of the moving body and the current distance between the certain position and the moving body.

Also, an electronic device of another embodiment of the present invention, includes a memory for storing map data including position information of a certain position and expressing a map of a predetermined range including the certain position; a current position information obtaining portion configured to obtain a current position information of a moving body being outside of the map of a predetermined range; a distance calculation portion configured to calculate a current distance between the certain position and a position of the moving body based on the position information of the certain position included in the map stored in the memory and the current position information of the moving body obtained by the current position information obtaining portion; a moving direction specifying portion configured to specify a current moving direction of the moving body; a display image generating portion configured to generate a map image of the map by adding a mark expressing a plurality of information on a straight line connecting the certain position on the map and the current position of the moving body; and a display apparatus for displaying the map image; wherein the plurality of information expressed by the mark includes the current moving direction of the moving body and the current distance between the certain position and the position of the moving body.

A display processing method of an embodiment of the present invention, includes: a first step for obtaining a map data including position information on a certain position and expressing a map of a predetermined range including the certain position and storing the same; a second step for obtaining a current position information of a moving body being outside of the map of the predetermined range; a third step for calculating a current distance between the certain position and the position of the moving body based on the position information of the certain position included in the map stored in the first step and the current position information of the moving body obtained in the second step; a fourth step for specifying a current moving direction of the moving body; a fifth step for generating a map image of the map by adding a mark expressing a plurality of information on a straight line connecting the certain position on the map and the current position of the moving body; and a sixth step for displaying the map image generated in the fifth step.

The display processing method may further includes a seventh step for generating a map image, wherein the mark in the fifth step is updated every certain time.

A program to make electronic device execute of an embodiment of the present invention, may include: a first processing for obtaining and storing a map data including a position information on a certain position and expressing a map of a predetermined range including the certain position; a second processing for obtaining a current position information of a moving body being outside of the map of the predetermined range; a third processing for calculating a current distance between the certain position and the position of the moving body based on the position information of the certain position included in the map stored in the first processing and the current position information of the moving body obtained in the second processing; a fourth processing for specifying a current moving direction of the moving body; a fifth processing for generating a map image of the map by adding a mark expressing a plurality of information on a straight line connecting the certain position on the map and the current position of the moving body; and a sixth processing for displaying the map image generated in the fifth processing.

According to the present invention, it is possible to provide an electronic device, a display processing method and a program for simultaneously displaying a direction and distance of a moving object and a moving direction of the moving object outside of a display range of a map, seen from a certain position in the map.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Below, a map display system including a portable device according to an embodiment of the present invention will be explained.

Figure 1:
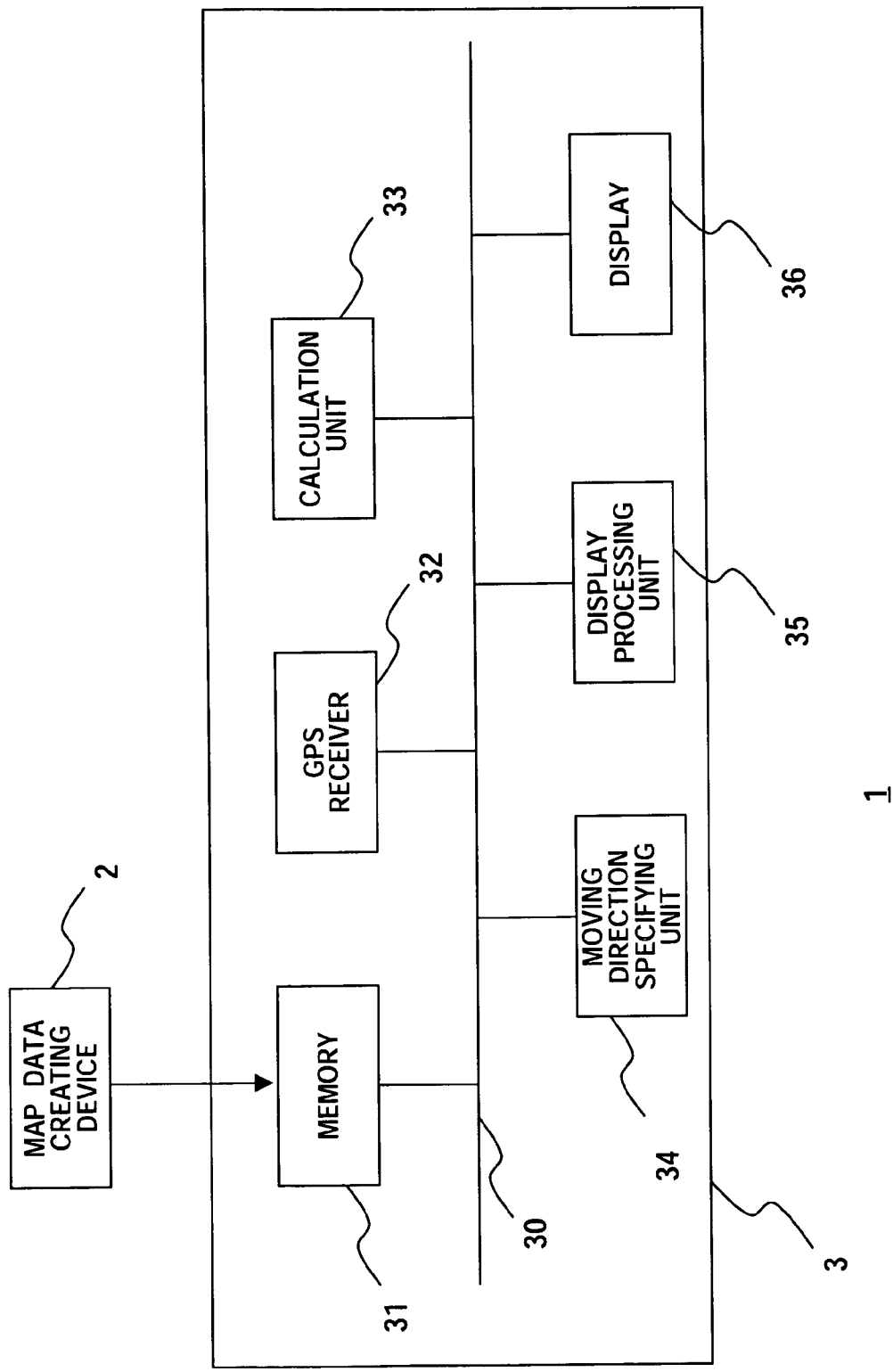
FIG. 1 is a block diagram of a map display system 1 according to an embodiment of the present invention.

FIG. 1 is a block diagram of a map display system 1 according to the present embodiment of the present invention.

As shown in FIG. 1, the map display system 1 includes a map data generating device 2 and a portable device 3. The portable device 3 includes a memory 31, a GPS receiver 32, a calculation unit 33, a moving direction specifying unit 34, a display processing unit 35 and a display 36.

Here, the portable device 3 is an example of the electronic device of the present invention.

The map data generating device 2 generates a map data of a certain range and transmits to the portable device 3.

A map of a certain range is, for example, a map for indicating a certain destination, etc.

Also, map data generated by the map data generating device 2 includes position information of longitude and latitude, etc. of each point (position) in the map.

Note that a method of transmitting a data to the portable device 3 may be wired or unwired.

The memory 31 of the portable device 3 stores a map data, etc. received from the map data generating device 2.

The GPS receiver 32 communicates with a GPS satellite and obtains a current position information.

The calculation unit 33 calculates a distance between a destination and a current position based on the current position information and position information of the destination in the map data.

The moving direction specifying unit 34 specifies a current moving direction of a user carrying the portable device 3.

The display processing portion 35 determines whether the user is within the current map based on the position information obtained by the GPS receiver 32 and, when the user is out of the map, generates a map for displaying based on distance information, etc. calculated in the calculation unit 33.

The display 36 displays the map generated by the display processing portion 35.

The memory 31, GPS receiver 32, calculation unit 33, moving direction specifying unit 34, display processing unit 35 and display 36 are connected, for example, by a data line 30.

Note that the memory 31 is an example of the memory portion of the present invention, the GPS receiver 32 is an example of the current position information obtaining portion, the calculation unit 33 is an example of the distance calculation portion of the present invention, the moving direction specifying unit 34 is an example of the moving direction specifying portion of the present invention, and the display processing unit 35 is an example of the display screen generation portion of the present invention.

Next, a map image generated by the display processing unit 35 will be explained.

Figure 2:
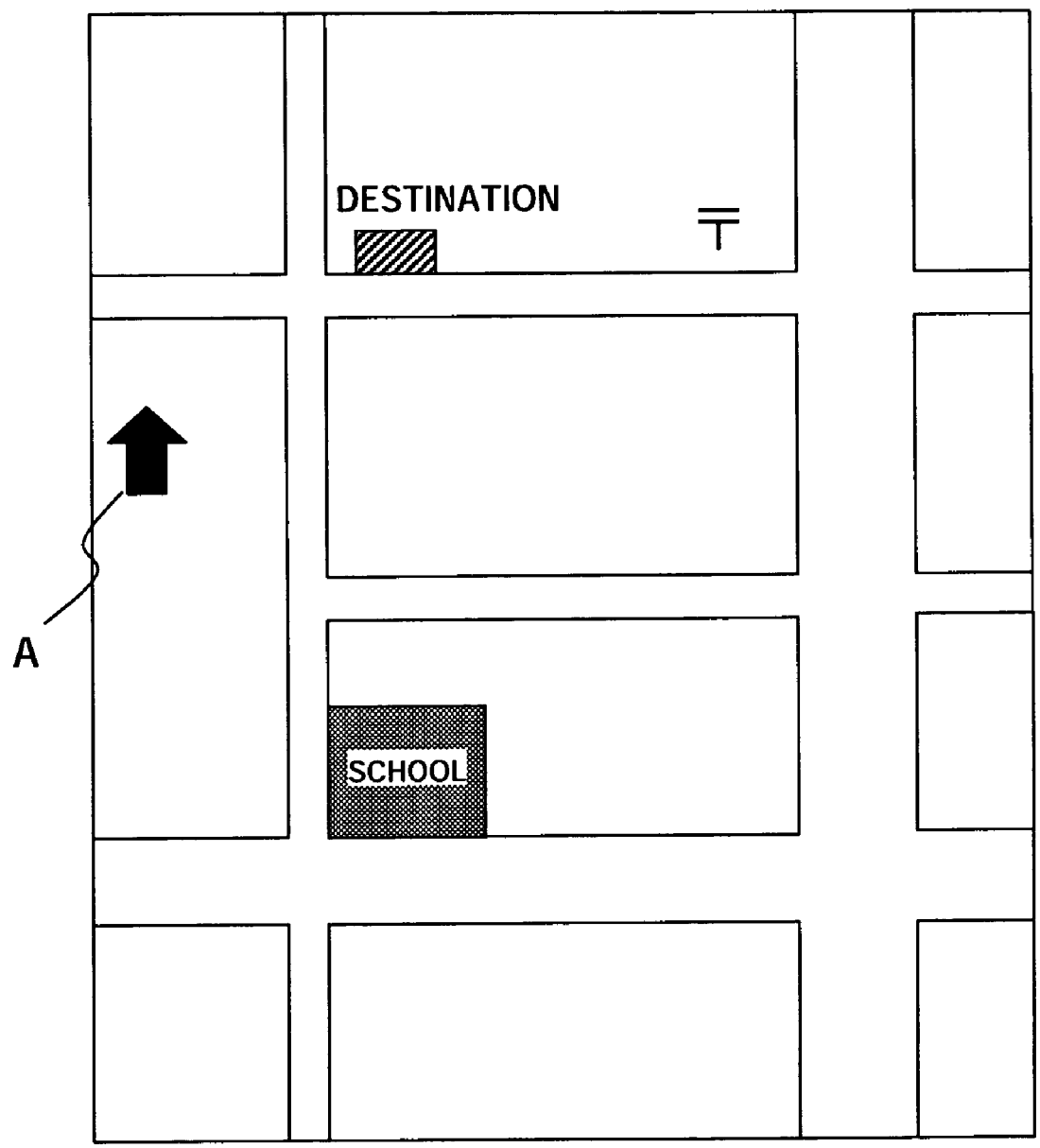
FIG. 2 is an example of a map image by a display processing portion 35.

FIG. 2 is an example of a map image generated by the display processing unit 35. The map image shown in FIG. 2 is a map image of the case where a user of the map display system 1 is out of the displayed range of the map.

As shown in FIG. 2, a map image generated by the display processing unit 35 includes an arrow A.

The arrow A indicates a current direction of the user from the destination in the map, a moving direction of the user and a distance from the destination to the current position of the user.

Figure 3:
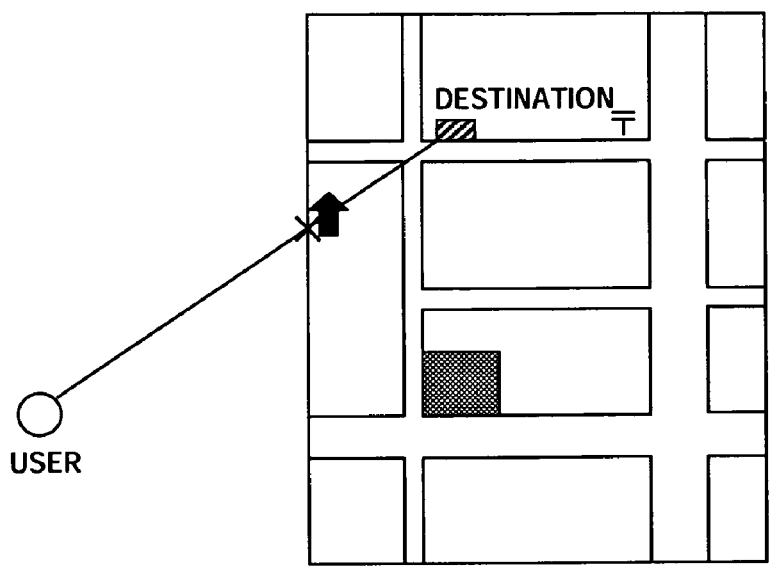
FIG. 3 is a view for obtaining a position for displaying an arrow.

FIG. 3 is a view for obtaining a position for displaying the arrow.

The arrow A positions at a crossing point of a straight line from the destination to the current position of the user and an edge of the map, so that it indicates the direction of the user from the destination. Also, the direction of the arrow A indicates the moving direction of the user at the present, and a size of the arrow A indicates a distance from the destination to the current position of the user.

Figure 4:
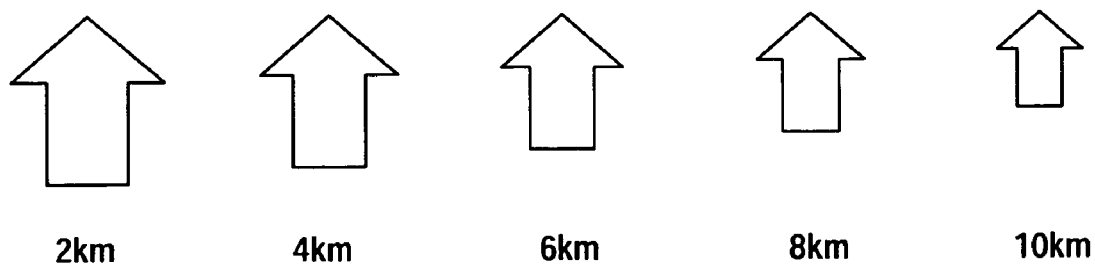
FIG. 4 is a view showing a relationship of a distance and a size of an arrow.

A size of the arrow A may be, for example as shown in FIG. 4, defined in advance. Alternately, it may be a predetermined size at a certain distance or longer, while at a shorter distance than that, it may be transformed to be a linear shape in accordance with the distance.

Next, a specific example that the user moves will be explained.

Figure 5:
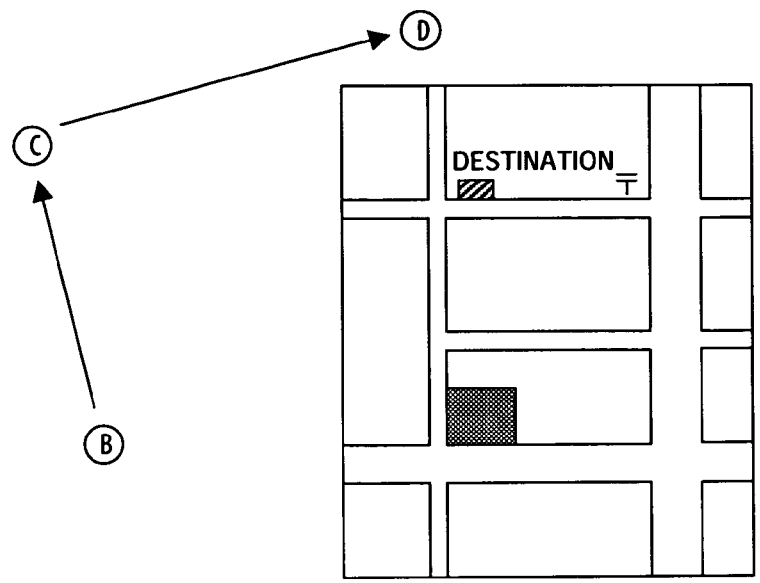
FIG. 5 is a view of an example of a moving path of a user for explaining a specific example of a map image generated by a portable device 3 of the present embodiment of the present invention.

For example, it is assumed that the user carrying the portable device 3 moves from the B point to C point, then to D point shown in FIG. 5.

Figure 6:
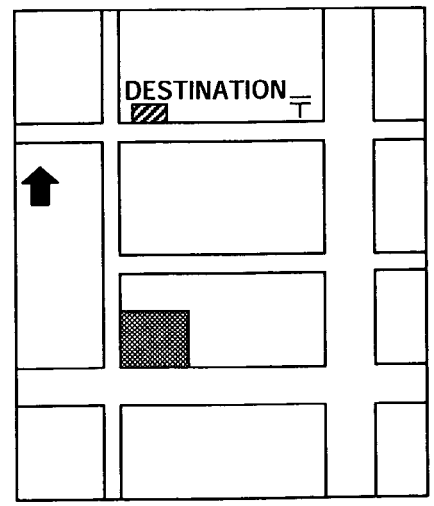
FIG. 6 is a view of a map image when the user is at B point.

In this case, a map image to be displayed when the user is at the B point is as shown in FIG. 6.

Figure 7:
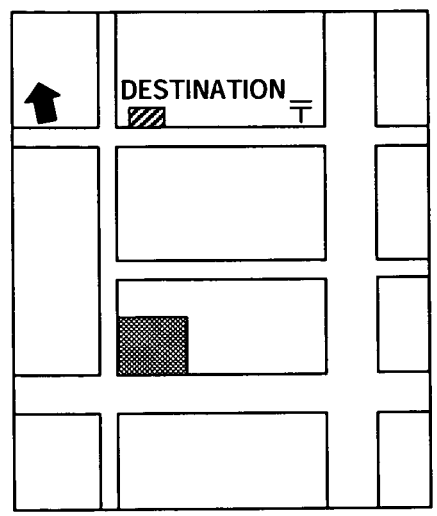
FIG. 7 is a view of a map image when the user is at C point.
Figure 8:
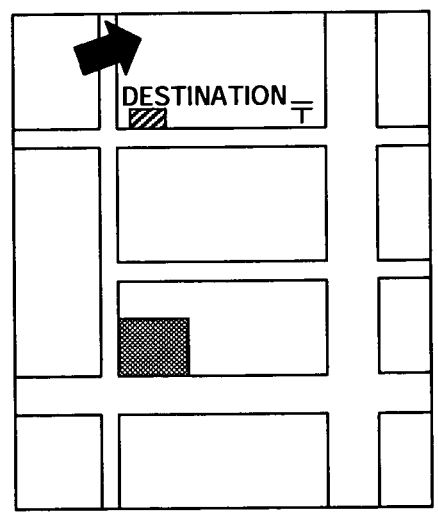
FIG. 8 is a view of a map image when the user is at D point.

In the same way, map images to be displayed at the C point and D point are as shown in FIG. 7 and FIG. 8, respectively.

When the user moves from the B point to the C point, as shown in FIG. 7, a position of the arrow shifts by the method explained above. However, a distance from the destination to the user has not changed much, so that a size of the arrow does not change. While, as the user moves from the B point to the C point, the direction of the arrow shows a direction responsive to that.

When the user moves from the C point to the D point, as shown in FIG. 8, a position of the arrow shifts by the method explained above. Also, since the D point is closer to the destination than the C point, the arrow becomes bigger. Furthermore, since the user moves from the C point to the D point, the direction of the arrow shows a direction responsive to that.

Next, an operation example of the map display system will be explained.

Figure 9:
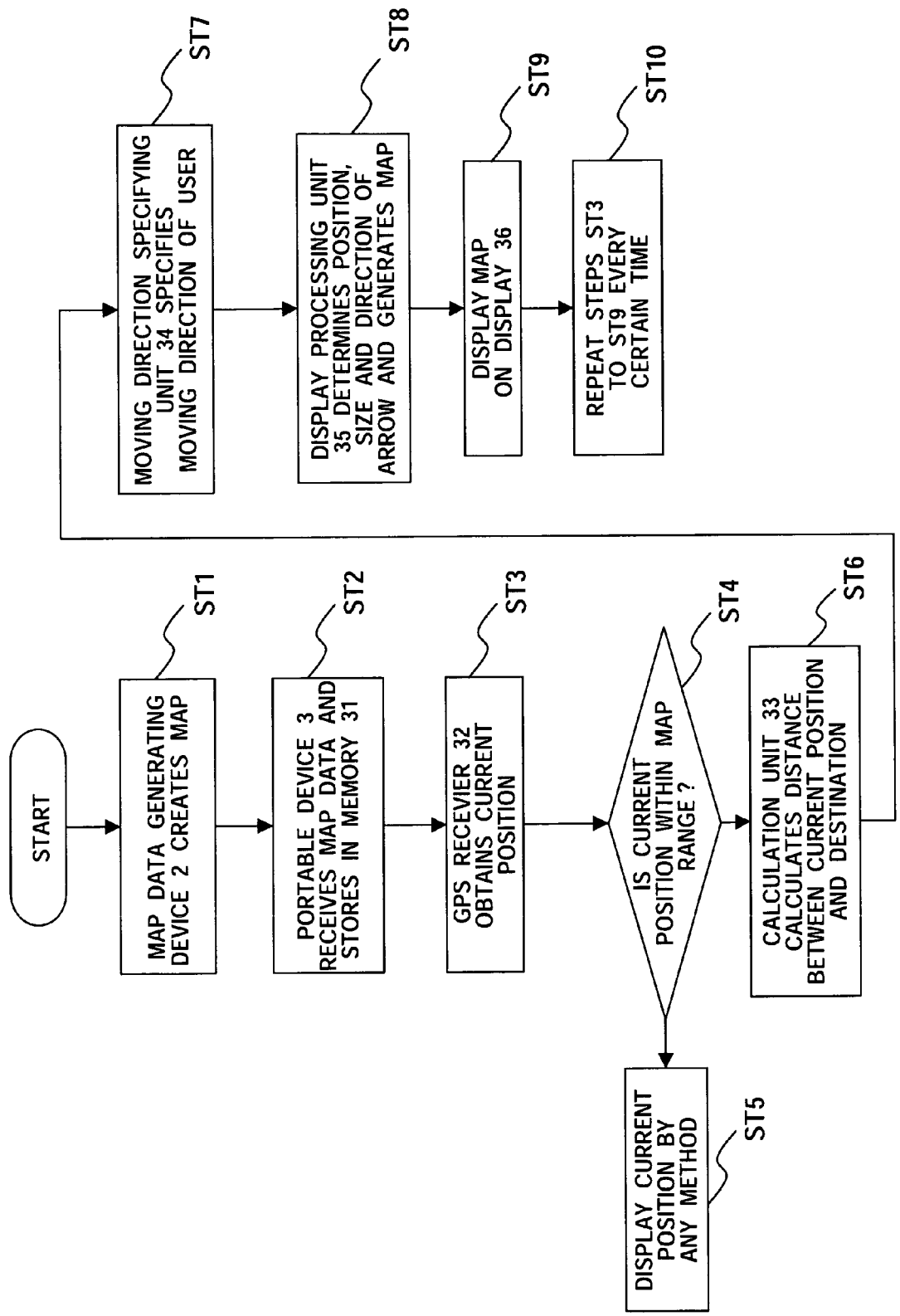
FIG. 9 is a flowchart of an operation example of the map display system 1.

FIG. 9 is a flowchart of an operation example of the map display system 1.

Step ST1:

The map data generating device 2 generates a map including a certain destination and transmits the same to the portable device 3. This map data includes a position information of each point in the map. Here, the position information is information for specifying a position, such as longitude and latitude.

Step ST2:

The portable device 3 receives a map data generated in the step ST1 and stores the same in the memory 31.

Step ST3:

The GPS receiver 32 obtains a current position information of the portable device 3.

Step ST4:

The display processing unit 35 determines whether or not the current position is within a display range of the map data received in the step ST2 based on the current position information of the portable device 3 obtained in the step ST3 and proceeds to a step ST5 when it is in the range, while not, proceeds to a step ST6.

Step ST5:

When the portable device 3 is in the map received in the step ST2, the display processing unit 35 generates a map displaying the current position by any method and displays the same on the display 36.

As the method, there is, for example, a method of displaying an arrow at a position of the portable device 3 in the map and indicating the moving direction by the direction of the arrow. This is just an example and a displaying method when the portable device 3 is within the map is not limited in the present invention.

Step ST6:

The calculation unit 33 calculates a distance from the current position of the portable device 3 to the destination based on the current position information obtained in the step ST3 and position information of the destination in the map data.

Step ST7:

The moving direction specifying unit 34 specifies the current moving direction of the portable device 3.

The method of specifying the moving direction may be, for example, a method of calculating based on a history of current position information obtained by the GPS receiver 32 or a method of detecting by an electronic compass or other device. These are examples and the method of specifying the moving direction is not limited to them in the present invention.

Step ST8:

The display processing unit 35 determines a position, size and direction of the arrow in the map based on the current position information of the portable device 3, position information of the destination, the distance between the destination and the current position calculated in the steps ST6 and the moving direction specified in the step ST7, and combines them with the map data stored in the memory to generate a map image to be displayed.

Step ST9:

The display 36 displays a map image generated in the step ST8.

Step ST10:

The portable device 3 repeats the processing from the step ST3 to the step ST9 every certain time. A certain time here is, for example, thirty seconds and one minute, that is, the time until the user obtains a new information. This time may be set to a predetermined time in advance or determined freely by the user.

Note that the step ST2 explained above is an example of a first step of the present invention, the step ST3 is an example of a second step of the present invention, the step ST6 is an example of a third step of the present invention, the step ST7 is an example of a fourth step of the present invention, the step ST8 is an example of a fifth step of the present invention, the step ST9 is an example of a sixth step of the present invention, and the step ST10 is an example of a seventh step of the present invention.

Also, the step ST2 is an example of a first processing executed by the program of the present invention, the step ST3 is an example of a second processing executed by the program of the present invention, the step ST6 is an example of a third processing executed by the program of the present invention, the step ST7 is an example of a fourth processing executed by the program of the present invention, the step ST8 is an example of a fifth processing of the program of the present invention, the step ST9 is an example of a sixth processing executed by the program of the present invention, and the step ST10 is an example of a seventh processing executed by the program of the present invention.

As explained above, according to the portable device 3 of the present embodiment according to the present invention, when the user is out of the displayed range of a map including the destination, the current direction of the user seen from the destination, the distance from the destination to the user and the moving direction of the user can be displayed at a time without increasing a indicating items.

The present invention is not limited to the above embodiment.

Namely, it should be understood by those skilled in the art that a plurality of modifications, combinations, sub-combinations and alternations may occur depending on design requirements and other factors insofar as they are within the scope of the appended claims or the equivalents thereof.

In the above embodiment, an explanation was made on a portable device for generating a map image to be displayed based on the current position of the portable device 3 and the destination, however, it is not necessarily the destination but a certain position on the map in the present embodiment according to the present invention. For example, the portable device may generate a map image based on relationship between the center of the map and the position of the portable device.

Furthermore, in the above embodiment, the map data generated by the map data generating device 2 includes the position information, such as the longitude and latitude of each point (position) on the map, but the data may be any as far as it includes the position information of at least one certain point (position) on the map, that is, the destination explained above, etc.

Also, in the above embodiment, the distance between the current position of the user and the destination is expressed by a size of the arrow, but the distance may be expressed by colors or shading of the arrow in the present invention according to the present invention. For example, a method of showing a blue arrow when the distance is long and a red arrow when short, and a method of showing a light-colored arrow when the distance is long and a thick-colored arrow when short, etc. may be mentioned. Note that the methods explained here are just examples and the present invention is not limited to them.

Also, in the above embodiment, the arrow was taken as an example of a mark, but it is not necessarily an arrow and may be any mark capable of expressing a direction and size, for example, illustrations of a car or a person may be used.

It should be understood by those skilled in the art that various modifications, combinations, sub-combinations, and alterations may occur depending on design requirements and other factors insofar as they are within the scope of the appended claims or the equivalents thereof.

What is claimed is:

1. An electronic device, comprising:
   a memory for storing map data including for expressing a map of a predetermined range including a certain position;
   a current position information obtaining means for obtaining a current position information of a moving body being outside of the map of a predetermined range;
   a distance calculation means for calculating a current distance between the certain position and a position of the moving body based on the position information of the certain position and the current position information of the moving body obtained by the current position information obtaining means;
   a moving direction specifying means for specifying a current moving direction of the moving body;
   a display image generation means for generating a map image of the map and a mark expressing a plurality of information including the current position of the moving body relative to the certain position and
   a current moving direction of the moving body and the current distance between the certain position and the moving body.

2. An electronic device as set forth in claim 1, wherein the mark is indicated on the map at a location that is approximately at an outer edge of the map on a line between the current position and the certain position.

3. An electronic device as set forth in claim 1, wherein the display image generating means generates the map image, wherein the mark is updated every certain time.

4. An electronic device, comprising:
   a memory for storing map data for expressing a map of a predetermined range including a certain position;
   a current position information obtaining portion configured to obtain a current position information of a moving body being outside of the map of a predetermined range;
   a distance calculation portion configured to calculate a current distance between the certain position and a position of the moving body based on the position information of the certain position and the current position information of the moving body obtained by the current position information obtaining portion;
   a moving direction specifying portion configured to specify a current moving direction of the moving body;
   a display image generating portion configured to generate a map image of the map and a mark expressing a plurality of information including the current position of the moving body relative to the certain position and
   the current moving direction of the moving body and the current distance between the certain position and the current position of the moving body.

5. An electronic device as set forth in claim 4, wherein the mark is displayed on the map at a location that is approximately at an outer edge of the map on a line between the current position and the certain position.

6. An electronic device as set forth in claim 4, wherein the display image generating portion generates the map image, wherein the mark is updated every predetermined time.

7. A display processing method executed by a system under control of a microprocessor, including:
   providing information for expressing a map of a predetermined range including a certain position and storing the same;
   obtaining a current position information of a moving body being outside of the map of the predetermined range;
   calculating a current distance between the certain position and the current position of the moving body based on position information of the certain position and the current position information of the moving body;
   specifying a current moving direction of the moving body;
   generating a map image and adding a mark expressing a plurality of information including the current position of the moving body relative to the certain position, a current moving direction of the moving body and a current relative distance between the certain position and the moving body.

8. A display processing method as set forth in claim 7, further including generating a map image, wherein the mark is updated every certain time.

9. An electronic device including a memory on which a program is stored, that, when executed performs the following operations:
   obtaining and storing map data for expressing a map of a predetermined range including a certain position;
   obtaining a current position information for a moving body being outside of the map of the predetermined range;
   calculating a current distance between the certain position and the current position of the moving body
   specifying a current moving direction of the moving body;
   generating a map image including a mark expressing a plurality of information including the current position of the moving body relative to the certain position, a current moving direction of the moving body and a current relative distance between the certain position and the moving body.

* * * * *